D. CLERICO.
NON-SKIDDING DEVICE FOR VEHICLE WHEELS.
APPLICATION FILED DEC. 6, 1916.
1,319,512. Patented Oct. 21, 1919.
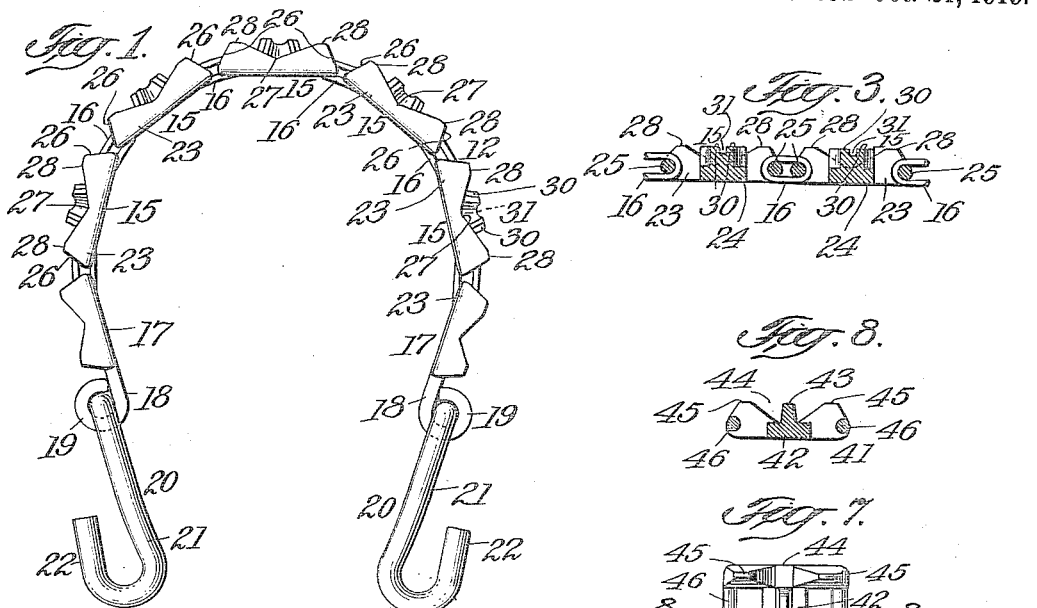
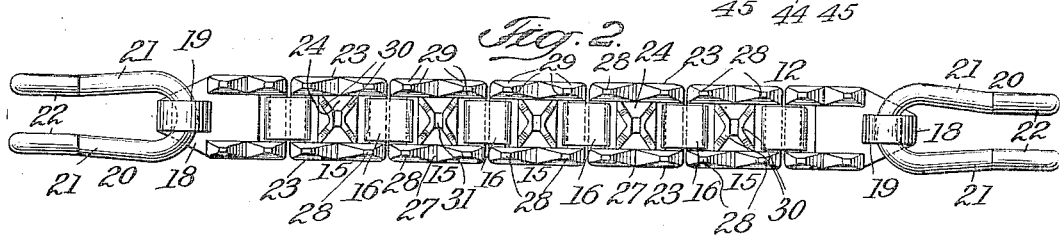
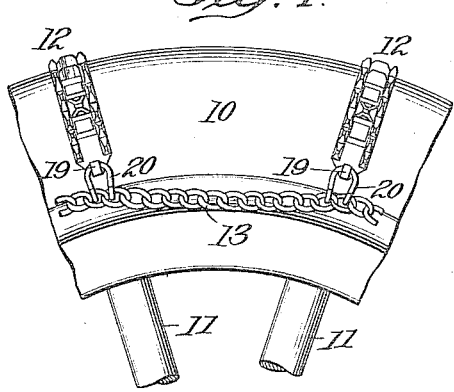
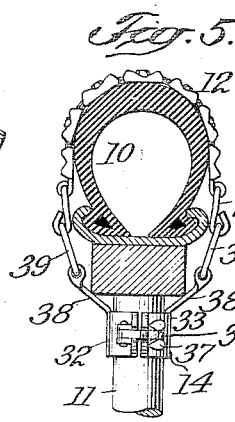
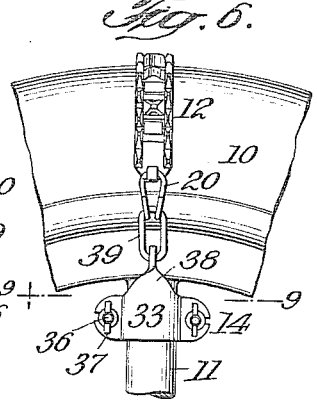
Inventor
DOMINICK CLERICO
By his Attorney

UNITED STATES PATENT OFFICE.

DOMINICK CLERICO, OF YONKERS, NEW YORK.

NON-SKIDDING DEVICE FOR VEHICLE-WHEELS.

1,319,512.  Specification of Letters Patent.  Patented Oct. 21, 1919.

Application filed December 6, 1916. Serial No. 135,292.

*To all whom it may concern:*

Be it known that I, DOMINICK CLERICO, a citizen of the United States, and a resident of Yonkers, in the county of Westchester and State of New York, have invented certain new and useful Improvements in Non-Skidding Devices for Vehicle-Wheels, of which the following is a specification.

The invention pertains more particularly to transverse anti-skid devices or chains applied to the tires of automobile and other vehicle wheels to prevent the skidding of the wheels when on slippery or other surfaces.

There have been many forms of anti-skid chains devised, but a demand exists for one which may be more efficient than the others and probably not as expensive. The object of my invention is to provide a thoroughly efficient set of anti-skid devices or chains to be applied transversely upon the tires of automobile wheels and which may be produced at reasonable expense. A further purpose of the invention is to provide anti-skid chains of the class referred to which will avoid injury to the tire.

The transverse anti-skid device or chain of my invention is composed of links hingedly connected together and has at its ends suitable pivoted hooks by which the device or chain may be connected with the means by which the same is secured to the wheel. The links constituting the body of the chain of my invention are of special formation and each is in one individual piece and the adjoining links of the chain are freely connected together by small loops, the whole presenting a chain whose inner surface which engages the tire is broad and flat and whose outer surface has on each operative link a series of projections to engage the road, there preferably being not less than five of these projections so disposed that two are at each side of each of said links and one at about the transverse center of the link. The links intermediate their ends and central transverse portion are open, thus leaving at the ends of the link transverse crossbars adapted to receive the loops by which the links are connected together. The link of my invention admits of modification, and therefore in the drawings I illustrate two forms of the link, both having the main features of construction and being substantially identical with the exception that at the transverse center of the link one construction differs from the other in the respects hereinafter pointed out. A transverse chain composed of the links of my invention is not only efficient and capable of being readily manufactured at reasonable expense, but is one of great strength and durability and capable of withstanding rough treatment.

The invention will be fully understood from the detailed description hereinafter presented, reference being had to the accompanying drawings, in which:

Figure 1 is a side elevation of an anti-skid device embodying my invention;

Fig. 2 is a top view of the same extended outwardly to lie flat;

Fig. 3 is a longitudinal section through two links of the device or chain and shows the loops, partly broken away for connecting the links together;

Fig. 4 is a side view of a portion of the tire of a wheel having applied thereto the anti-skid chains of my invention, these transverse anti-skid chains being in this instance connected at their ends with chains which extend around the wheel adjacent to the inner portion of the tire;

Fig. 5 is a transverse section through a portion of a wheel having the transverse anti-skid chain of my invention applied thereto, said chain being shown as secured to the wheel by means of a clamp applied to a spoke thereof and to which clamp the ends of the chain are connected;

Fig. 6 is a side elevation of the same;

Fig. 7 is a detached top view of one link of my transverse anti-skid chain, this link being modified in form from the construction of link shown in Figs. 1, 2 and 3;

Fig. 8 is a vertical section through the same taken on the dotted line 8—8 of Fig. 7, and Fig. 9 is a horizontal section through the spoke shown in Figs. 5 and 6, and illustrates the clamp by which the anti-skid chain is secured upon the wheel, the section being on the dotted line 9—9 of Fig. 6.

In the drawings, 10 designates a portion of the tire of an automobile wheel, 11 the spokes of said wheel and 12 the anti-skid devices or chains of my invention to be transversely applied upon the tire 10 and secured at their ends to means carried by the wheel for connecting the chains thereto. One of the transverse chains 12 is shown in Figs. 1 and 2 and two of these chains are illustrated in Fig. 4, wherein I illustrate the wheel as having a chain 13 extending along each side thereof with the anti-skid chains of my invention connected therewith. In Figs. 5 and 6 I illustrate one of the transverse chains of my invention as secured upon the wheel by means of a clamp 14, which is detachably fastened upon the spoke 11.

Referring more particularly to Figs. 1, 2 and 3, 15 denotes the individual operative links of the chain, and 16 the loops which pivotally connect adjacent links 15 together. The links 15 correspond with one another, and the end links, which I number 17, correspond with each other and have extensions 18 thereon for the formation of eyes 19 to receive the securing hooks 20. Each of the hooks 20 is formed from a rod folded at about its center so as to form two members 21, whose outer ends are reversely bent, as at 22, to form hook members.

The links 15 are each in one integral cast metal piece and comprise side members 23, a central transverse member 24 and end transverse bars 25. The links between their central portion 24 and transverse bars 25 are open. The transverse bars 25 are slightly above the inner or bottom surface of the link, and the pairs of adjoining links receive the loops 16, which are plain flat-metal loops extending between the side members 23 of the links, as shown more clearly in Fig. 2. The side members 23 of each link 15 are, at their end portions, inclined, as at 26, and said sides between their end portions are recessed inwardly on converging lines, as at 27, thereby leaving at each end of each side of the link a projection 28 for engagement with the road bed, and which projections have inclined end surfaces, as shown. The side surfaces of the side members 23 extend outwardly on converging lines, their opposite side surfaces being beveled outwardly, as at 29 (Fig. 2), and this results in the projections 28 having beveled side surfaces, as well as beveled end edges.

The transverse member or bar 24 of each link 15 is integral at its ends with the side members 23, and said member or bar 24 may be of the construction shown in Figs. 1 and 2 or that illustrated in Figs. 7 and 8. In the construction shown in Figs. 1, 2 and 3 the bar member at its central lower portion is flat, and upon this flat portion there is an outwardly projecting section which, in this instance, is formed of two V-flanges 30, which extend inwardly from the corners to the central portion of the member or bar 24 and preferably, though not necessarily, are separated from each other at the converging angles of the V's by a small recess 31. The flanges 30, when considered together, define approximately an X-shape extending transversely of the link and rising from the flat portion of the member or bar 24; the ends of the members defining the X-shape are preferably beveled outwardly. The recesses 27 in the side members 23 are in line with the space between the ends of the flanges 30. The flanges 30 form a central projection or contact for coöperation with the projections 28 in engaging the road-bed.

The clamp 14 shown in Figs. 5, 6 and 9, comprises two substantially corresponding sections 32, 33 adapted to fit upon opposite sides of the spoke 11 and having at their opposite side edges slotted facing lips 34, 35. Screws 36 are hinged on the lips 34 and may be swung into the slots of the lips 35, and then by means of nuts 37 on said screws the two sections of the clamp may be firmly bound on the spoke 11. The lips 35 may have outwardly turned outer edges to be engaged by the side of the nuts 37 and therewith prevent the screws 36 from being jarred from their connection with said lips 35 during the travel of the vehicle. The clamp sections 32, 33 have outwardly diverging arms 38 carrying pivoted links 39, which are open loops and receive the hook members on the ends of the chain 12. The clamp sections 32, 33 may have a lining 40 of felt or the like to prevent marring of the spoke 11 by the clamp.

The link shown in Figs. 7 and 8 is numbered 41 and may be employed in the chains 12 as a substitute for the links 15 therein. The link 41 differs from the link 15 mainly in the form of the central cross-bar member, which in Figs. 7 and 8 is numbered 42. The member 42 has a transverse projecting rib or contact 43, which tapers downwardly and outwardly at its ends and is spaced from the side members of the link. The contact projection 43 is in line with the recesses 44 in the side members of the link, and said side members afford end contact projections 45. The link 41 is open between its central cross-bar and its ends and at said ends are the cross-bars 46 to receive the flat metal connecting loops 16.

The transverse chains may be made up of the links 15 or the links 41, as may be preferred. I think possibly the link 41 may be more compactly and durably constructed than the link 15 but both forms of links are desirable. The broad flat connecting loops 16 are very efficient and present, as do the links, broad flat surfaces to the tire.

What I claim as my invention and desire to secure by Letters-Patent is:

1. An anti-skid mechanism for the tires of wheels comprising a series of chains transversely applied upon the tire and means for securing said chains upon the wheel, said chains each comprising a series of closely related integral cast metal links presenting flat surfaces to the tire and having side members affording projections to engage the road-bed, a middle transverse bar connecting said side members and affording a projection to engage the road-bed and standing at an angle to the projections afforded by said side members and means parallel with and spaced from said middle bar and connecting the end portions of said side members.

2. An anti-skid mechanism for the tires of wheels comprising a series of chains transversely applied upon the tire and means for securing said chains upon the wheel, said chains each comprising a series of closely related integral cast metal links presenting flat surfaces to the tire and having side members affording projections to engage the road-bed, a middle transverse bar connecting said side members and affording a projection to engage the road-bed and standing at an angle to the projections afforded by said side members and transverse bars parallel with and spaced from said middle bar and connecting the end portions of said side members outwardly beyond the plane of the flat inner surface of the link.

3. An anti-skid mechanism for the tires of wheels comprising a series of chains transversely applied upon the tire and means for securing said chains upon the wheel, said chains each comprising a series of closely related integral metal links presenting flat surfaces to the tire and having side members which have inclined sides and ends and are transversely recessed to afford a plurality of projections to engage the road-bed, and a transverse bar connecting said side members and affording a projection to engage the road-bed and having outwardly inclined end portions and which projection stands at an angle to the projections afforded by said side members.

4. An anti-skid mechanism for the tires of wheels comprising a series of chains transversely applied upon the tire and means for securing said chains upon the wheel, said chains each comprising a series of closely related integral metal links presenting flat surfaces to the tire and having side members which have inclined sides and ends and are transversely recessed to afford a plurality of projections to engage the road-bed, and a transverse bar connecting said side members and affording an approximately X-shaped projection to engage the road-bed and having outwardly inclined end portions and which projection stands at an angle to the projections afforded by said side-members.

Signed at New York city, in the county of New York and State of New York, this 4th day of December, A. D. 1916.

DOMINICK CLERICO.

Witnesses:
 ARTHUR MARION,
 CHAS. C. GILL.